United States Patent
Sistia et al.

(10) Patent No.: US 8,131,940 B2
(45) Date of Patent: Mar. 6, 2012

(54) METHODS AND APPARATUSES TO SUPPORT MEMORY TRANSACTIONS USING PARTIAL PHYSICAL ADDRESSES

(75) Inventors: Krishnakanth Sistia, Hillsboro, OR (US); Yen-Cheng Liu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 519 days.

(21) Appl. No.: 11/694,999

(22) Filed: Mar. 31, 2007

(65) Prior Publication Data

US 2008/0244195 A1 Oct. 2, 2008

(51) Int. Cl.
*G06F 13/14* (2006.01)
*G06F 12/16* (2006.01)

(52) U.S. Cl. .. 711/141; 711/162; 711/146; 711/E12.103

(58) Field of Classification Search .................. 711/141, 711/143, 146, E12.103
See application file for complete search history.

(56) References Cited

U.S. PATENT DOCUMENTS

| | | | | |
|---|---|---|---|---|
| 3,523,283 A | * | 8/1970 | Cohen et al. | 710/3 |
| 5,875,472 A | * | 2/1999 | Bauman et al. | 711/150 |
| 5,983,289 A | * | 11/1999 | Ishikawa et al. | 710/35 |
| 6,922,756 B2 | * | 7/2005 | Hum et al. | 711/145 |
| 7,366,847 B2 | * | 4/2008 | Kruckemyer et al. | 711/144 |
| 7,953,936 B2 | * | 5/2011 | Tsien | 711/141 |
| 2005/0240734 A1 | * | 10/2005 | Batson et al. | 711/141 |
| 2006/0179258 A1 | * | 8/2006 | Dooley et al. | 711/150 |
| 2006/0271767 A1 | * | 11/2006 | Osanai et al. | 712/216 |

* cited by examiner

*Primary Examiner* — Mardochee Chery
(74) *Attorney, Agent, or Firm* — Schubert Law Group PLLC (57) ABSTRACT

Methods and apparatuses to support memory transactions using partial physical addresses are disclosed. Method embodiments generally comprise home agents monitoring multiple responses to multiple memory requests, wherein at least one of the responses has a partial address for a memory line, resolving conflicts for the memory requests, and suspending conflict resolution for the memory requests which match partial address responses until determining the full address. Apparatus embodiments generally comprise a home agent having a response monitor and a conflict resolver. The response monitor may observe a snoop response of a memory agent, wherein the snoop response only has a partial address and is for a memory line of a memory agent. The conflict resolver may suspend conflict resolution for memory transactions that match the partial address of the memory line until the conflict resolver receives a full address for the memory line.

15 Claims, 11 Drawing Sheets

| ADDRESS TYPE | HIGH VALID | LOW VALID | |
|---|---|---|---|
| INVALID | 0 | 0 | |
| PARTIAL | 0 | 1 | — 212 |
| VALID | 1 | 1 | — 213 |
| ILLEGAL | 1 | 0 | |

| FULL/PARTIAL | HI VAL. | LO VAL. | HI MA. | LO MA. | RESULT |
|---|---|---|---|---|---|
| 1 | 0 | 0 | 0 | 0 | NO MATCH |
| 1 | 0 | 0 | 0 | 1 | NO MATCH |
| 1 | 0 | 0 | 1 | 0 | NO MATCH |
| 1 | 0 | 0 | 1 | 1 | FULL INVAL MATCH |
| 1 | 0 | 1 | 0 | 0 | NO MATCH |
| 1 | 0 | 1 | 0 | 1 | PARTIAL VALID MATCH |
| 1 | 0 | 1 | 1 | 0 | NO MATCH |
| 1 | 0 | 1 | 1 | 1 | PARTIAL VALID MATCH |
| 1 | 1 | 0 | 0 | 0 | ILLEGAL |
| 1 | 1 | 0 | 0 | 1 | ILLEGAL |
| 1 | 1 | 0 | 1 | 0 | ILLEGAL |
| 1 | 1 | 0 | 1 | 1 | ILLEGAL |
| 1 | 1 | 1 | 0 | 0 | NO MATCH |
| 1 | 1 | 1 | 0 | 1 | NO MATCH |
| 1 | 1 | 1 | 1 | 0 | NO MATCH |
| 1 | 1 | 1 | 1 | 1 | FULL VALID MATCH |
| 0 | 0 | 0 | 0 | 0 | NO MATCH |
| 0 | 0 | 0 | 0 | 1 | PARTIAL INVALID MATCH |
| 0 | 0 | 0 | 1 | 0 | ILLEGAL |
| 0 | 0 | 0 | 1 | 1 | ILLEGAL |
| 0 | 0 | 1 | 0 | 0 | NO MATCH |
| 0 | 0 | 1 | 0 | 1 | ILLEGAL |
| 0 | 0 | 1 | 1 | 0 | ILLEGAL |
| 0 | 0 | 1 | 1 | 1 | ILLEGAL |
| 0 | 1 | 0 | 0 | 0 | ILLEGAL |
| 0 | 1 | 0 | 0 | 1 | ILLEGAL |
| 0 | 1 | 0 | 1 | 0 | ILLEGAL |
| 0 | 1 | 0 | 1 | 1 | ILLEGAL |
| 0 | 1 | 1 | 0 | 0 | NO MATCH |
| 0 | 1 | 1 | 0 | 1 | PARTIAL VALID MATCH |
| 0 | 1 | 1 | 1 | 0 | ILLEGAL |
| 0 | 1 | 1 | 1 | 1 | ILLEGAL |

| INCOMING FULL / PARTIAL | FULL VALID MATCH | FULL INVALID VALID MATCH | PARTIAL VALID MATCH | PICK NEW AATID | SET ALLOCROQ BIT? |
|---|---|---|---|---|---|
| FULL | 0 | 0 | 0 | YES | NO |
| | 0 | 0 | 1 | YES | YES |
| | 0 | 1 | 0 | YES | NO |
| | 0 | 1 | 1 | YES | YES |
| | 1 | 0 | 0 | NO | NO |
| | 1 | 0 | 1 | NO | YES |
| | 1 | 1 | 0 | ILLEGAL | ILLEGAL |
| | 1 | 1 | 1 | ILLEGAL | ILLEGAL |
| PARTIAL | 0 | 0 | 0 | NO | NO |
| | 0 | 0 | 1 | NO | YES |
| | 0 | 1 | 0 | MISS | MISS |
| | 0 | 1 | 1 | MISS | MISS |
| | 1 | 0 | 0 | ILLEGAL | ILLEGAL |
| | 1 | 0 | 1 | ILLEGAL | ILLEGAL |
| | 1 | 1 | 0 | MISS | MISS |
| | 1 | 1 | 1 | MISS | MISS |

# METHODS AND APPARATUSES TO SUPPORT MEMORY TRANSACTIONS USING PARTIAL PHYSICAL ADDRESSES

FIELD

The embodiments herein generally relate to the field of distributed memory computing systems. More particularly, the embodiments relate to methods and apparatuses to support memory transactions using partial physical addresses for distributed memory computing systems.

BACKGROUND

Distributed memory computing systems, such as multi-processor (MP) systems, may have a distributed shared memory interconnect architecture. In these multi-processor systems, the task of maintaining memory coherency is frequently divided between the logic of two or more system agents. Logic of a first agent, which may be referred to as a home agent, may be responsible for managing a portion of system memory. The home agent logic may also be responsible for returning data to cache agents, alternatively referred to as caching agents, resolving conflicts between caching agents, and processing memory routines which maintain proper memory order. Logic of caching agents may be responsible for providing responses and supplying data for snoops from other system agents. Additionally, the caching agents may be responsible for providing data, with the correct cache state, to underlying processor caches.

One style or method of design for implementing home agent logic is referred to as a conflict address match (CAM) design. During operation, the home agent logic of CAM-based designs may compare the full physical addresses (PA) for incoming memory requests with full physical addresses for transactions which the home agent has already received. By performing comparisons using full physical addresses, the home agents can detect conflicts between transactions. Unfortunately, CAM-based designs present system designers with multiple implementation challenges as the number of processors increases in multi-processor (MP) systems. One problem stems from the fact that certain memory transactions do not send and/or receive full physical addresses in the MP systems. Other problems arise as the number of tracking elements and the required physical address size increase in the MP systems. As the number of tracking elements increases, as well as when the PA size increases, the MP systems often present problems related to required silicon implementation area, timing, and convergence.

There are no existing mechanisms which implement home agent logic so that the logic can adequately support the use of partial physical addresses. Consequently, logic designed for existing CAM-based home agents cannot generally accommodate MP systems while using a partial PA. Additionally, timing and convergence issues continue to pose problems for system designers when they implement MP systems which use a full PA for all memory transactions.

BRIEF DESCRIPTION OF THE DRAWINGS

Aspects of the embodiments will become apparent upon reading the following detailed description and upon reference to the accompanying drawings in which like references may indicate similar elements.

DETAILED DESCRIPTION OF EMBODIMENTS

The following is a detailed description of embodiments depicted in the accompanying drawings. The specification is in such detail as to clearly communicate the embodiments. However, the amount of detail offered is not intended to limit the anticipated variations of embodiments; but on the contrary, the intention is to cover all modifications, equivalents, and alternatives consistent with the spirit and scope of the embodiments as defined by the appended claims.

Generally speaking, methods and apparatuses to support memory transactions using partial physical addresses are contemplated. Method embodiments generally comprise one or more home agents monitoring multiple responses to multiple memory requests, wherein at least one of the responses has a partial address for a memory line, resolving conflicts of the memory requests, and suspending conflict resolution for the memory requests which match partial address responses until determining the full address. In various method embodiments, suspending conflict resolution may comprise pushing a transaction identification number of the partial address onto a response ordering queue. Additionally, the method embodiments may also involve popping the transaction identification number off the response ordering queue upon the determination of the full address. In many embodiments, a memory agent may initially have ownership of the memory line when another memory agent is requesting ownership of the memory line or requesting that the memory line be written back to a main memory of the home agent. To properly handle conflicting requests, the home agent may determine ownership of the memory line after resolving conflicts associated with it. In many of the embodiments, the responses may comprise snoop responses.

Apparatus embodiments generally comprise a home agent having a response monitor and a conflict resolver. The response monitor may observe a snoop response of a memory agent, wherein the snoop response only has a partial address and is for a memory line of a memory agent. The conflict resolver may establish priority for conflicting requests for a memory line of the memory agent. The conflict resolver may suspend conflict resolution for memory transactions which match the partial address of the memory line until the conflict resolver receives a full address for the memory line. In some apparatus embodiments, the memory agents comprise caching agents. In some apparatus embodiments, the response monitor may comprise a home tracker unit. In various embodiments, the snoop response may comprise a forwarding response or a write-back response. Further embodiments may have an active address table coupled with a response ordering queue as part of the conflict resolver.

While portions of the following detailed discussion describe methods and apparatuses to support memory transactions which use partial physical addresses for forwarding and write-back responses, persons of ordinary skill in the art will recognize that alternative embodiments may support memory transactions which use partial physical addresses for other types of responses. Persons of ordinary skill in the art will also recognize that even though embodiments herein generally describe memory transactions between home agents and caching agents, the methods and apparatuses may be employed by other types of system agents with different designations that perform essentially the same functions.

Figure 1A:
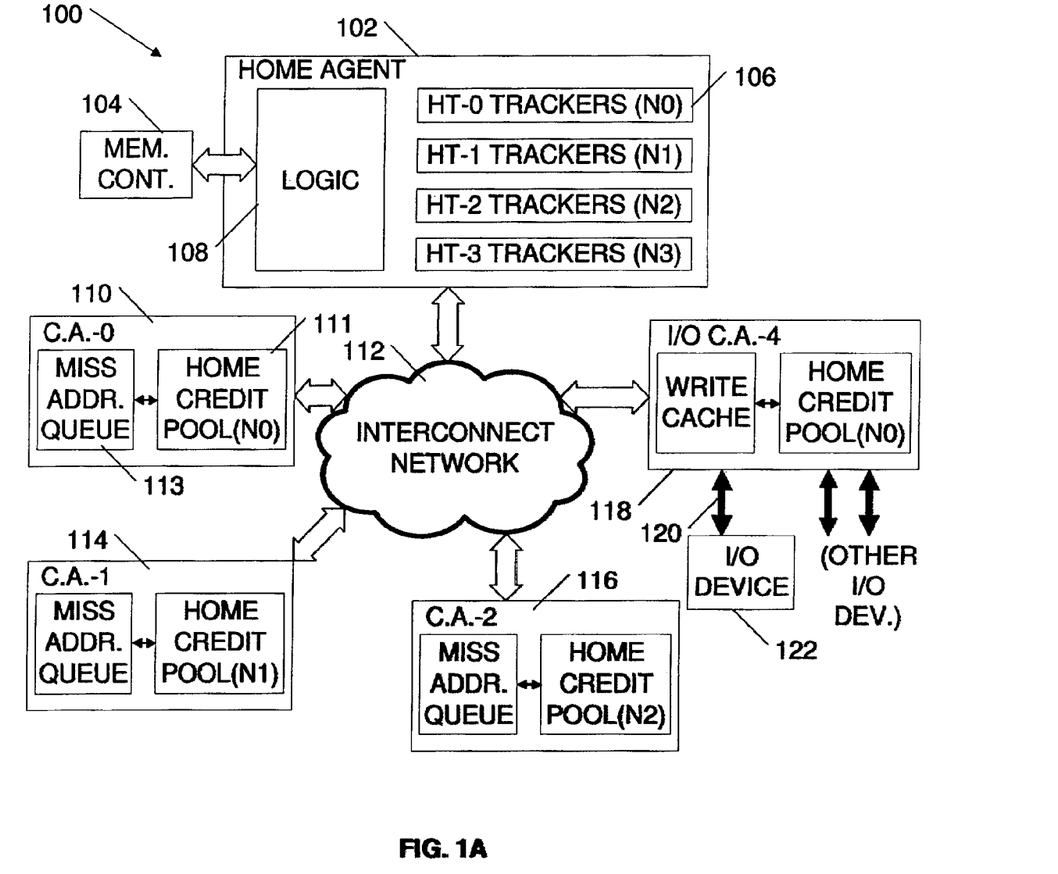
FIG. 1A depicts an embodiment of a system having a home agent, several caching agents, and an input-output caching agent connected via an interconnect network.

Turning now to the drawings, FIG. 1A depicts the high level architecture of a system 100. In some embodiments system 100 may comprise a computer system, such as a notebook computer, a desktop computer, or personal digital assistant (PDA). In other embodiments system 100 may comprise a different type of device, such as a personal video recorder (PVR), a digital video camera, or a video game machine. System 100 has a home agent 102 coupled with a number of memory agents, such as caching agents 110 and 114, via an interconnect network 112. Interconnect network 112 may allow each of the agents to communicate with other agents. For example, caching agent 116 may send and receive memory requests for transactions to and from input-output (I/O) caching agent 118 and home agent 102.

For the embodiment shown in FIG. 1A, caching agents 110, 114, 116, and 118 of system 100 are pre-allocated a certain number of trackers in home agent 102, such as trackers 106. With such pre-allocation of trackers, each caching agent may manage its own set of trackers using a home credit pool. For example, caching agent 110 may manage trackers 106 using home credit pool 111. Home logic 108 may control access to memory controller 104, detect memory transaction conflicts, resolve the conflicts, and provide memory ordering services.

For each transaction, home logic 108 may receive a transaction request from a caching agent. Additionally, home logic 108 may receive the responses associated with the transaction request from all the other caching agents. For example, caching agent 110 may need to obtain ownership for a specific memory line, such as a cache line, stored in one of the other caching agents. Caching agent 110 may issue snoop requests to caching agents 114, 116, and 118, as well as issuing a read-for-ownership (RFO) to home agent 108. Caching agents 114, 116, and 118 may transmit responses to those snoops back to caching agent 110, which may keep track of the responses with a miss address queue 113. Some of the responses from caching agents 114, 116, and 118 may include full address information for the requested memory line, while others may only issue partial address information. Home agent 108 may monitor or observe those responses. By using the address information from the responses and examining other transactions in progress, home logic 108 may determine ownership of the cache line.

In the embodiment shown in FIG. 1A, system 100 has a single home agent 102. Alternative embodiments may have two, four, or more home agents coupled with additional memory controllers and associated memory. Also for the embodiment shown in FIG. 1A, system 100 has I/O caching agent 118 which may allow agents of system 100, such as home agent 102, to send and receive information to and from external or peripheral devices. For example, I/O device 122 may comprise a mass storage device or a video monitor coupled to system 100 via an I/O interface 120. Alternative embodiments may have varying numbers of I/O caching agents, as well as varying numbers of other caching agents. Additionally, alternative embodiments may have memory agents that use memory for other functions instead of cache memory functions like the embodiment of FIG. 1A.

Figure 1B:
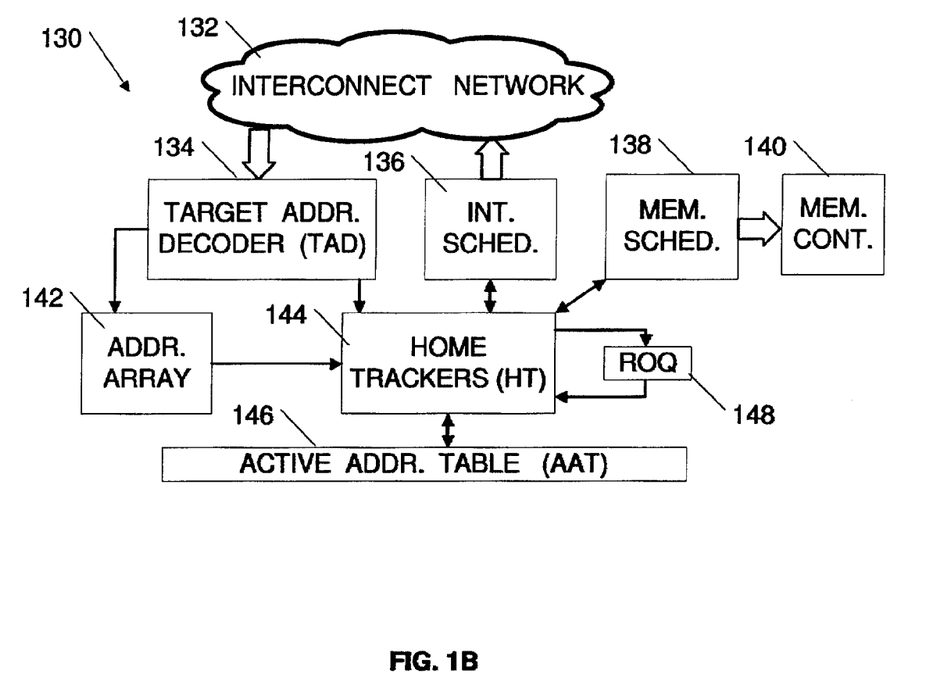
FIG. 1B shows an embodiment of a home agent coupled to an interconnect network.

To better illustrate the configuration and operation of the logic of a home agent, we move now to FIG. 1B. FIG. 1B depicts an embodiment of home logic 130 comprising numerous function blocks. Home logic 130 may operate in one home agent of a system, such as home logic 108 in home agent 102 shown in FIG. 1A. Similar to the manner in which home agent 102 is coupled to interconnect network 112 so that it may interact with caching agents of system 100, home agent 130 may be coupled to interconnect network 132.

Home logic 130 may comprise a Target Address Decoder (TAD) 134. TAD 134 may comprise a mapping table for mapping the addresses of requested memory lines. TAD 134 may generate a target address for a memory transaction. A target address may either be a dynamic random access memory (DRAM) channel or it may be a configuration space in a processor. TAD 134 may couple with an address array 142. Address array 142 may contain all the physical addresses for all valid transactions in home logic 130. In an embodiment, address array 142 may comprise a structured array with a CAM port, a write port, and a read port. Address array 142 may allow home logic 130 to perform numerous system operations, such as detecting memory transaction conflicts.

Home logic 130 may also comprise an interconnect scheduler 136. Interconnect scheduler 136 may schedule transactions to be sent via interconnect network 132 using credits for different virtual channels of interconnect network 132. Interconnect scheduler 136 may evaluate all transactions of home trackers 144 which are ready to issue commands via interconnect network 132 and arbitrate among the transactions to select one to issue to interconnect network 132. Memory scheduler 138 may function similar to interconnect scheduler 136. Memory scheduler 138 may schedule transactions which are ready to be issued to a memory controller 140.

Home Trackers (HT) 144 may perform numerous functions, such as maintaining a finite state machine (FSM) which tracks the current state of all home trackers, such as trackers 106 of home agent 102 in FIG. 1A. HT 144 may track conflict and ordering information for memory transactions. HT 144 may maintain virtual first-in-first-out queues (FIFOs) for all conflicting transactions. HT 144 may communicate with an Active Address Table (AAT) 146 concerning conflict information and implement the conflict resolution actions mandated by AAT 146. AAT 146 may comprise logic which resolves conflicts of memory transactions. AAT 146 may collect conflict and transaction information from HT 144 and build conflict list. Based on the number and types of responses received for all conflicting transactions, the logic of AAT 146 and home trackers 144 may work in conjunction with a response ordering queue 148 to determine the ownership of the cache line between them. Response ordering queue (ROQ) 148 may temporarily store requested transaction identification numbers (RTIDs) for transactions which match a partial address provided by a memory agent. Once a full address for the partial address is determined, affected RTIDs may be removed from ROQ 148. All transactions which refer to the same physical address (i.e conflicting transactions) may have only one entry in AAT 146.

With a rudimentary understanding of how the elements of home logic 130 operate, we can now examine how home logic 130 may process memory transactions. In examining how home logic 130 processes such transactions, we can understand how responses, such as snoop responses, which contain partial addresses may present problems if not handled properly. In doing so, we can illustrate how ROQ 148 may help prevent such problems.

When a new transaction arrives, home logic 130 may operate differently depending on whether the portion of the transaction, which may often be simply referred to as transaction, is a request or a response. We will examine both separately.

Request

If the transaction is a request, then TAD 134 performs a lookup to determine a target address associated with transaction. As mentioned, the target address may be in DRAM or in other configuration space of a processor. TAD 134 may then send the full physical address and RTID information of the transaction to address array 142. In parallel, TAD 134 may send other request information, such as source node identification (ID), request type, and the RTID, to HT 144. Logic of address array 142 may perform an address comparison with existing addresses in address array 142, write the address of the transaction into address array 142 using an entry indexed by the RTID of the transaction, and return the comparison results to the logic of HT 144. Depending on the results of the comparison, one of two things may then occur. If the comparison results in no matches, logic of HT 144 may pick an entry ID from a pool of available AAT IDs and send the request information to AAT 146. Additionally, HT 144 may send a request to memory scheduler 138 to start a memory access. If there are any matches from the comparison, then HT 144 may pick an AAT ID from one of the matching entries. In addition, HT 144 may queue a new request at the end of a virtual FIFO of all conflicting requests. In other words, the virtual FIFO may comprise a conflict ordering FIFO. HT 144 may also send the request information to this AAT ID.

If the new transaction which arrives at home logic 130 is a response and not a request, home logic 130 may respond in three different ways depending whether the response is a conflict response (RspCnflt*), a response forward or response write-back response (Rsp*Fwd or Rsp*Wb), or another type of response. [Note: The "*" denotes that the "*" part of the transaction response may be different letters and indicate a variety of different responses. Unless otherwise noted the "*" can be generally be considered an "irrelevant" response item from the associated transmitting system agent, meaning the system course of action to the response will be the same regardless of the actual lettered response.]

Response is a "RspCnflt*"

If the new transaction is "RspCnflt*" response, then the associated transaction data which is transmitted in the response will contain the conflict information. Logic of HT 144 may update a virtual FIFO with this information and send a message to AAT 146 indicating that a conflict has occurred for the current transaction.

Response is a "Rsp*Fwd" or "Rsp*Wb"

If the new transaction is a "Rsp*Fwd" or "Rsp*Wb", then these transactions may contain either a full or a partial physical address of the transaction in addition to the response information. TAD 134 may send the full or partial address to address array 142 for comparison with existing addresses. If address array 142 finds a match for a full address, then HT 144 may select the AAT ID of the conflict and send either a forward (Fwd*) message or write-back (Wb*) message to AAT 146. If address array 142 does not find a match, HT 144 may allocate a new AAT entry and send either a "Fwd*" or a "Wb*" message to AAT 146.

Upon receiving a "Fwd*" message, logic of AAT 146 will set the ownership for the transaction to the requesting agent. The reason for this is due to the fact that the forwarding agent will have already sent the data and transferred ownership to the requester. On the other hand, if the message is a "wb*", then AAT 146 will not send any ownership information since the associated data will arrive at the home logic. Once memory scheduler 138 writes the data to memory controller 140, HT may assign ownership.

Response is not a "Rsp*Fwd", "Rsp*Wb", or "RspCnflt*"

If the new transaction is a response but not a "Rsp*Fwd", a "Rsp*Wb", or a "RspCnflt*", then the transaction may not contain any address information. HT 144 may use the source node ID information for the transaction to identify a destination entry in HT 144 and pass response information to the destination entry. HT 144 may verify that all responses are received from all the memory agents and send an appropriate message to AAT 146.

At this point, HT 144 may wait for responses from AAT 146. When AAT 146 indicates that home logic 130 may send a notice of completion to the requesting agent, then HT 144 may transfer ownership to the requesting agent. Once memory controller 140 completes a memory lookup, home logic 130 may send the data and completion notice to the requesting agent. Additionally, logic of AAT 146 may indicate whether home logic 130 needs to transfer ownership from the current requester to a new one in case of a conflict. HT 144 may then schedule appropriate responses using interconnect scheduler 136.

The embodiment of home logic 130 may support relatively large physical addresses. The need to support large physical addresses may arise, for example, when a system engineer is designing a multi-processor system with large quantities of memory. However, to support such large physical addresses, home logic 130 may need to rely on ROQ 148. The reason home logic 130 may need ROQ 148 to handle large physical addresses may stem from the number of tracking elements and the required physical address size increase in the MP system. To properly handle transaction conflicts, home logic 130 may need complete information for the transactions being available at any given time. If the complete information is available, home logic 130 may unequivocally detect conflicts at the time a transaction arrives at home logic 130. Unfortunately, complete physical address information may not always be available in larger and more complex MP systems. In other words, the number of bits required to represent the actual physical addresses may exceed the number of bits available for a given transaction, which may have been predetermined by a system interconnect standard. For example, the number of bits needed for a dual processor system may exceed 43 bits, while the number of bits needed for a multi-processor system may exceed 41 bits. Command packets, such as "Rsp*Fwd" and "Rsp*Wb" packets, may not contain more than 43 bits PA in the dual processor profile and not contain more than 41 bits PA in the multi-processor profile.

Figure 1C:
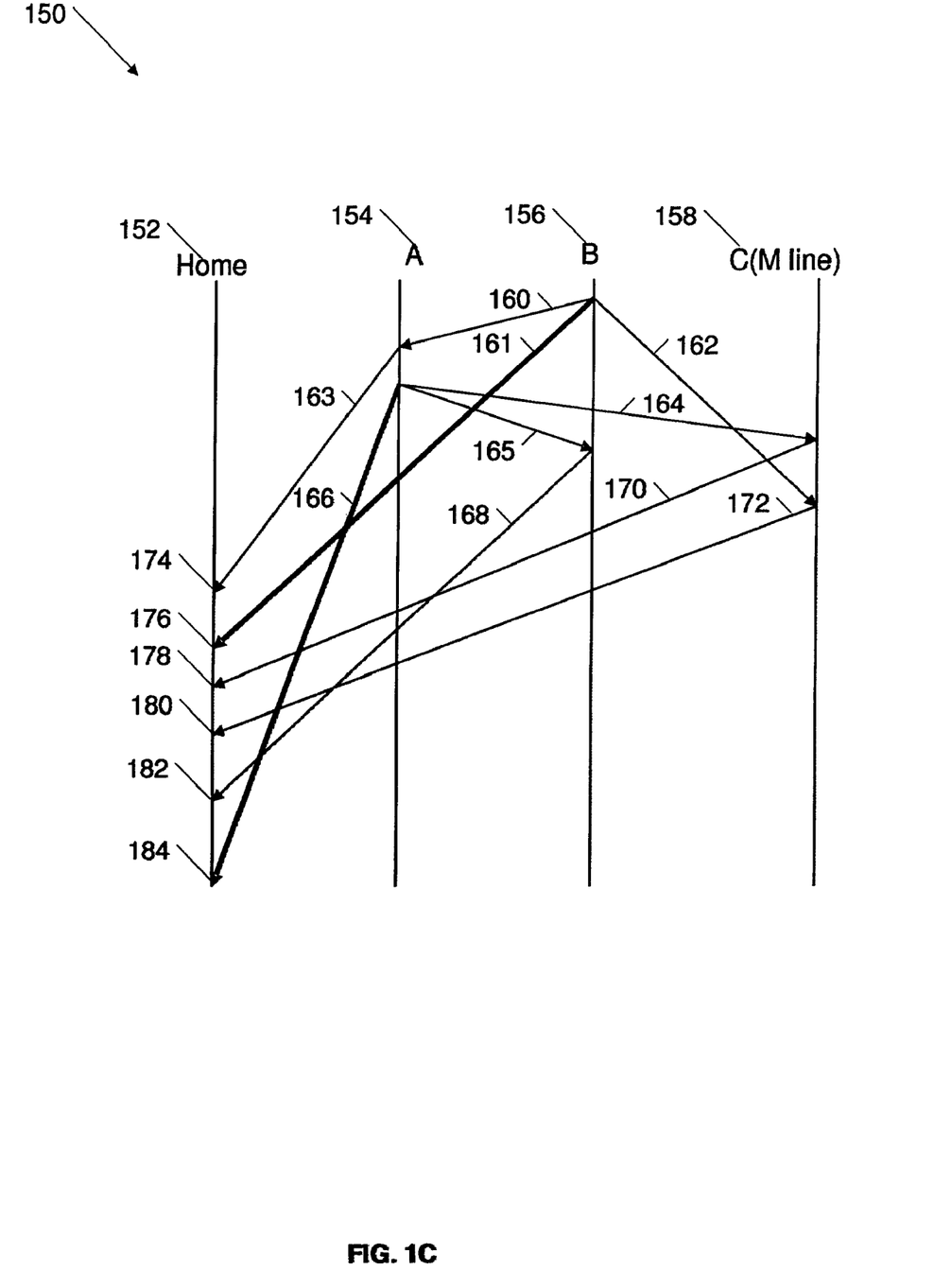
FIG. 1C illustrates how two caching agents may issue snoops for the same physical address in a system that uses partial physical addresses, and how a home agent may properly transfer ownership.

To see how partial address information may interfere with proper conflict resolution in home logic 130, and how ROQ 148 may assist in proper conflict resolution, we turn now to FIG. 1C. FIG. 1C is a vector diagram 150 illustrating the timing of transaction requests and transaction responses for a system comprising home agent 152 and caching agents 154, 156, and 158. Home agent 152 may correspond, for example, to home agent 102 having home logic 130, shown in FIG. 1A and FIG. 1B, respectively. Also, for the sake of illustration, caching agents 154, 156, and 158 may correspond to I/O caching agent 118, caching agent 116, and caching agent 110, respectively.

Caching agents 154 and 156 may send RFOs for the same physical address, when the requested cache line is present in caching agent 158. Request 164 from caching agent 154 may reach caching agent 158 before request 162 from caching agent 156. In response to request 164, caching agent 158 may forward the data to caching agent 154 and send a response 170 (RspFwdI) to home agent 152. Point 174 shows that home agent 152 may first receive, or monitor, response 163 from caching agent 154, corresponding to request 160. Response 163 may be an invalid response (RspI) since caching agent 154 has not yet sent snoop requests 164 and 165. Home agent 152 may then encounter request 161 from caching agent 156. At this point (176), the address array of home agent 152 will contain a valid address. However, home agent 152 may then (point 178) receive response 170 (RspFwdl) from caching agent 158 for snoop request 164 from caching agent 154. In scenarios where the PA is less than 41 bits, home agent 152 may have a complete address from response 170 which will fully match with request 161 from caching agent 156. Consequently, home agent 152 may detect the conflict and transfer ownership of the line to caching agent 154.

Conversely, in a system with a larger PA, the complete address may not be available from response 170. Unavailability of the complete address may cause home agent 152 to either conclude that there is no match or that there is only a partial match between the requested address from request 161 and the address from response 170. Subsequently at point 180, home agent 152 may receive response 172 (RspI) from caching agent 158 due to request 162 of caching agent 156. At this point in time (point 180), home agent 152 has seen all responses associated with request 161 from caching agent 156 and no conflicts have been detected. Unless otherwise prevented, home agent 152 may then incorrectly transfer ownership of the cache line to caching agent 156. Home agent 152 will finally (point 182) receive response 168 (RspCnflt) from caching agent 156; however this response will not prevent the previous transfer of ownership. The only other transaction with a full address, request 166, arrives too late (point 184) to prevent the incorrect transfer of ownership.

The conflict problem just described may result from the system architecture, such as certain CAM-based designs, and the fact that incomplete information is available in certain transaction packets, such as "Rsp*Fwd" and "Rsp*Wb" packets, once the PA supported in the design exceeds a certain bit size, such as 41 bits in a MP profile and 43 bits in DP profile. In order to deal with issue, the home agent may employ a Response Ordering Queue (ROQ) such as ROQ 148 shown in FIG. 1B. This queue may take advantage of some of the system interconnect invariants, such as predetermined channel ordering, and enable many designs, such as CAM-based designs, to handle the partial or incomplete address information until the full address is available. This ROQ may be used to block conflict resolution progress when there are partial matches and to release the block when the information uncertainty goes away, such as when the full PA is known for all transactions or all potentially conflicting transactions. Upon implementing an ROQ, CAM-based designs and other types of designs may support larger PAs without needing to resort to other alternatives which may be less desirable, such as using an extended address system.

The system interconnect logic, along with the logic of system agents, may provide certain channel ordering rules which may enable an ROQ to prevent incorrect conflict resolution. For the first channel ordering rule, assume we have a caching agent which contains a cache line that may be forwarded. When the caching agent receives multiple snoop requests for the cache line from other system agents, the channel ordering rule may provide that the first response the caching agent transmits to a home agent will be a forwarding response (Rsp*Fwd). Other responses from the caching agent, such as "RspS" or "RspI", will arrive at the home agent after the "Rsp*Fwd". For the second channel ordering rule, assume we have a caching agent which contains a write-back (Wb) to memory cache state. In this case, when the caching agent receives multiple snoop requests, the first response the caching agent transmits to a home agent will be a respone write-back (Rsp*Wb). Other responses from the caching agent, such as RspI, will arrive at the home agent after the "Rsp*Wb" is received.

Assuming an embodiment behaves according to the two aforementioned channel ordering rules, the embodiment may define a point in time when the home agent has received all transaction responses. This point in time, or machine state, may be referred to as an "AllRspRcvd" state. Additionally, an embodiment may define another point in time when the home agent has received a response having a partial address, such as "Rsp*Fwd" or "Rsp*Wb" responses. This state may be referred to as a "FwdOrWbRcvd" state. When an embodiment defines such states and encounters a group of conflicting transactions, conditional logic of the home agent which receives "Rsp*Fwd" or "Rsp*Wb" responses may enter the "FwdOrWbRcvd" state. Upon receiving all the remaining conflicting transactions, the logic may subsequently enter the "AllRspRcvd" state.

Upon establishing the "FwdOrWbRcvd" and "AllRspRcvd" states, a FIFO containing the RTIDs may be created in the home logic, such as home logic 108 in FIG. 1A. This FIFO may be referred to as an ROQ. A bit may be added to each tracker in home tracker logic to indicate if the entry needs to be allocated into the ROQ. For example, a bit may be added to trackers 106 and the other trackers of home agent 102. This bit may be referred to as an "AllocROQ" bit. The "AllocROQ" bit may be set when an incoming full address matches, at least partially, an ROQ entry having only a partial address. For example, the bit may be set when the lower 41 bits of the incoming full address match a "Fwd" response in the ROQ. Additionally, the "AllocROQ" bit may be set when an incoming partial address matches an existing entry having a full address.

Entries for which the AllocROQ bit is set may be allocated into the ROQ when the corresponding tracker enters either the "FwdOrWbRcvd" state or the "AllRspRcvd" state. In other words, any entries which either have partial address information or which have matched a partial address may be allocated into ROQ, meaning the RTID is pushed into ROQ, when either the home logic receives a "Fwd" or "Wb" response, or when the home logic receives all of the responses associated with the "Fwd" or "Wb" response. Because of the response ordering property described heretofore, one may see that the order of ownership for transactions which are affected by partial address information may be established by the order that the entries assume in the ROQ. In other words, the ROQ may have several properties by design.

First, when an entry is in the ROQ the information available to HT and AAT logic, which is used to determine ownership for the memory line of the entry, is incomplete. Any logic computation for ownership must be suspended, or blocked, until the entry is popped out of the ROQ. This may constitute the blocking property of the ROQ. Second, entries at the head of the ROQ may be popped under two conditions. The entry at the head may be popped or removed from the ROQ when the home logic did not receive either the "Rsp*Fwd" or the "Rsp*Wb" response for an entry. Additionally, the entry at the head may be popped when the home logic has received either the "Rsp*Fwd" or the "Rsp*Wb" response for the entry, and the home logic has also received the associated full address. For example, the actual request having the full address may have arrived at the home logic.

Third, ROQ entries at the head which do not meet the two conditions for popping as just described may be blocked. This blocking may continue until one of the two popping conditions is satisfied. Fourth, when entries are finally released from the ROQ the information necessary for determining memory line ownership will be available to HT and AAT logic, such that home logic processing may proceed.

Having these ROQ properties, home logic may contain or limit the negative impact of the uncertainty surrounding the partial addresses. When an entry is released from the ROQ, the "AllocROQ" bit may be reset. Resetting the bit may release the block on the entry so that home logic can continue processing it. A hold may be placed on an AAT tracker until the associated "AllocROQ" bit is reset. Placing such a hold may prevent the AAT from generating any system interconnect actions. When the "AllocROQ" bit is reset, the AAT will have updated and accurate information, will be able to correct its state, and be able to correctly determine ownership from then on. When viewed in this manner, one may see that the ROQ may serve as a temporary blocking mechanism.

As mentioned previously, the ROQ may work in conjunction with address array, HT, AAT, and other logic elements of a home agent. Various embodiments may need to design such individual elements of the home agent so that the elements work with the ROQ. For example, elements such as address array 142, HT 144, and AAT 146 shown in FIG. 1B, will need to be designed to work in conjunction with ROQ 148. FIG. 2A through FIG. 2G illustrate designs for home logic elements which may be employed in various embodiments.

Figure 2A:
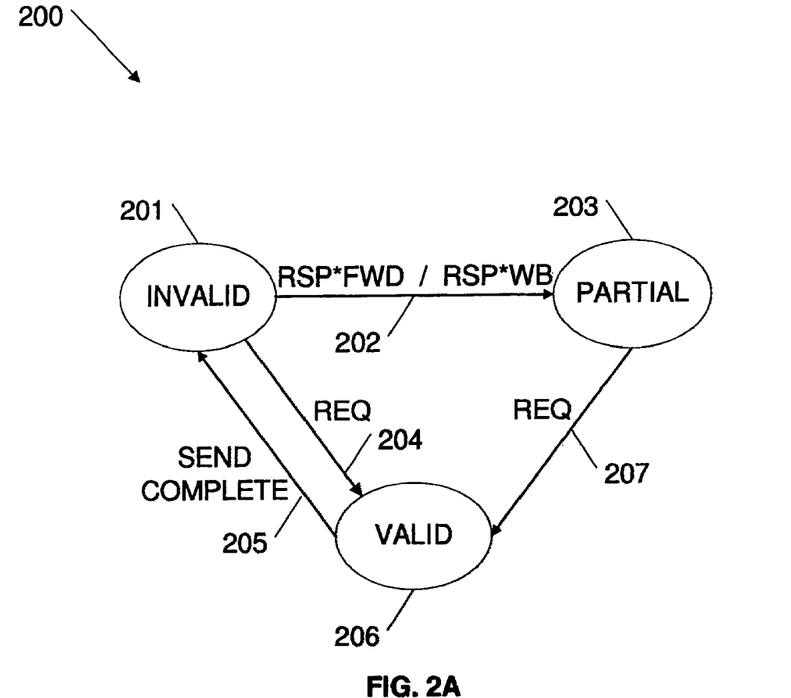
FIG. 2A depicts a state diagram which enables partial address matching for address CAM logic.
Figure 2B:
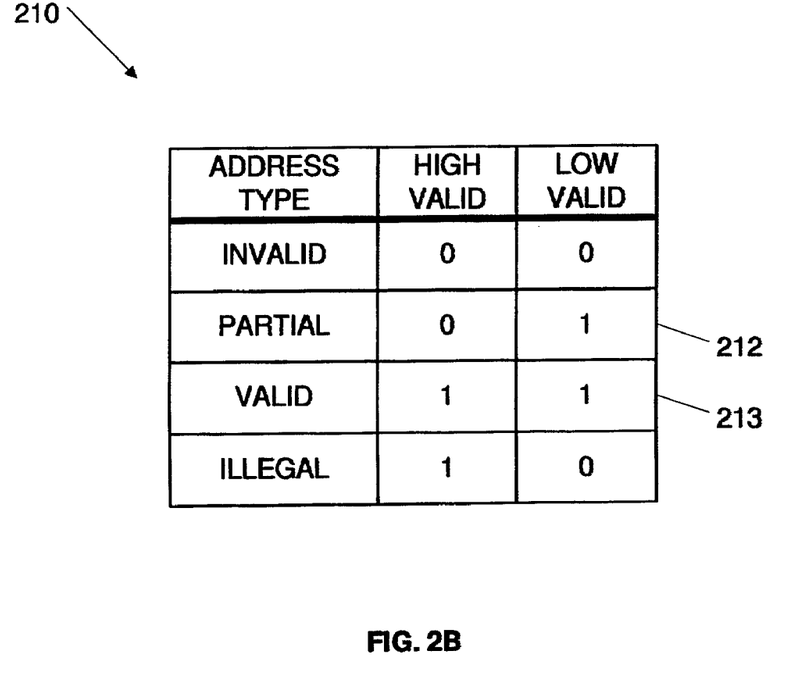
FIG. 2B depicts a state table for the state diagram of FIG. 2A.

FIG. 2A depicts a state diagram 200 which enables partial address matching for CAM logic. State diagram 200 may be employed, for example, in designing an embodiment of address array 142. Full address match logic may use one bit to represent whether an address is valid or not. In order to enable partial matches, a second bit may be added to address array 142. There may be two valid bits, represented by the designations "High Valid" and "Low Valid". "Low Valid" may indicate that the lower portion of an address, such as the bottom 41 bits of the PA for example, is valid. "High Valid" may indicate that the remaining PA bits are valid. Table 210 in FIG. 2B illustrates the meaning of the encodings, while state diagram 200 shows the transitions between the encodings. As shown in table 210, an incoming address may be deemed valid if both the "High Valid" and "Low Valid" bits are set (element 213). If the "Low Valid" bit is set, but the "High Valid" bit is not set, such a combination may indicate that the incoming address has a partial match (element 212).

If the home agent first receives a "Rsp*Fwd" or a "Rsp*Wb" (element 202), then the address may be marked as partial (elements 203 and 212), such that the "Low Valid" bit is set. When a request for a transaction arrives, whether the request arrives after the home agent receives the associated "Rsp*Fwd" or "Rsp*Wb" responses (element 207) or before (element 204), the address state may change to valid (elements 206 and 213). Upon completion of a transaction (element 205), the address state may change from valid (element 206) to invalid (element 201), whereupon the process may be repeated.

Figure 2C:
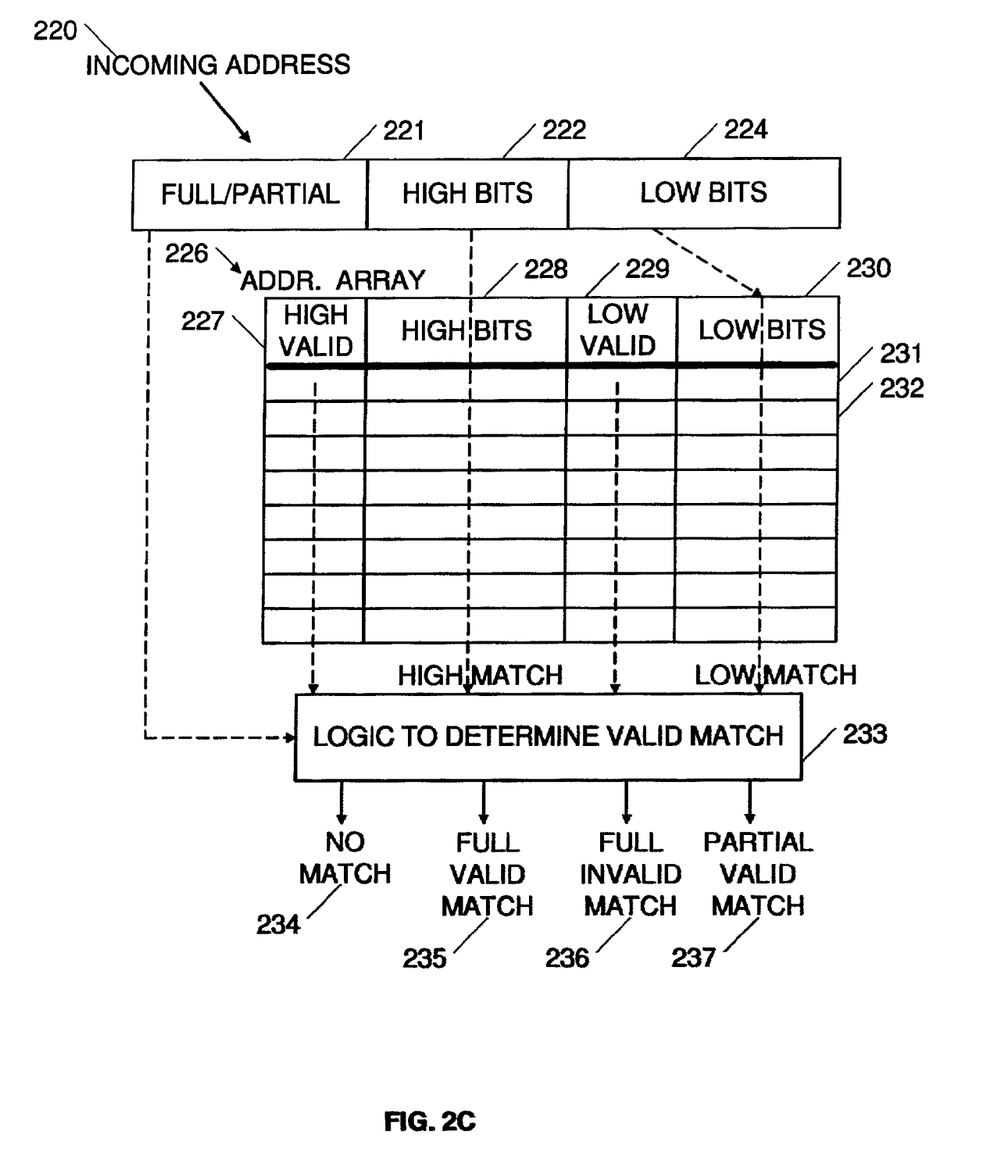
FIG. 2C illustrates how an address may be mapped into an address array having components for high and low address bits, high and low valid status bits, and how logic may determine different types of address matches.

FIG. 2C shows an embodiment of an address array and the resulting CAM outputs. An incoming address 220 may arrive at an address array 226 from a target address decoder. Incoming address 220 may divided into a set of low bits 224, a set of high bits 222, as well as one or more status bits 221 indicating whether incoming address 220 is a full or partial address. Each incoming address 220 may be stored as an entry in address array 226, such as entry 231 or entry 232. For example, low bits 224 of incoming address 220 may be stored in low bits field 230 and high bits 222 may be stored in high bits fields 228. Address array 226 may set one or more bits of low valid field 229 and one or more bits of high valid field 227, according to the type of the transaction, consistent with state diagram 200 in FIG. 2A and table 210 in FIG. 2B. For example, the transaction associated with incoming address 220 may comprise a request. For a request (element 204), address array 226 may have entry values of "1" for both high valid field 227 and low valid field 229 (consistent with element 213). At the time incoming address 220 is received by the address array, status bits 221 may be sent to address array logic 233 along with high bits 222 and low bits 224. Status bits 221 may enable address array logic 233 to compare incoming address 220, along with the status bits for high valid field 227 and low valid field 229, with the addresses of other transactions in the home logic. Based on this comparison, address array logic 233 may determine if there is no match 234, a full valid match 235, a full invalid match 236, or a partial valid match 237.

The logic comparison outputs of address array logic 233 may comprise vectors, each as wide as the number of trackers in home logic. For example, the match outputs vectors may be as wide as the four trackers of home agent 102 in FIG. 1A. The no match 234 output vector may indicate all entries for which neither low bits 224 nor high bits 222 matched with incoming address 220. Full valid match 235 vector indicates all entries for which incoming address 220 has a full match and the address state is valid. Full invalid match 236 vector indicates all entries for which incoming address 220 has full match and the address state is invalid. Partial valid match 237 vector indicates all entries for which the incoming address 220 matched low bit 224 and the bit for low valid field 229 is set.

Figure 2D:
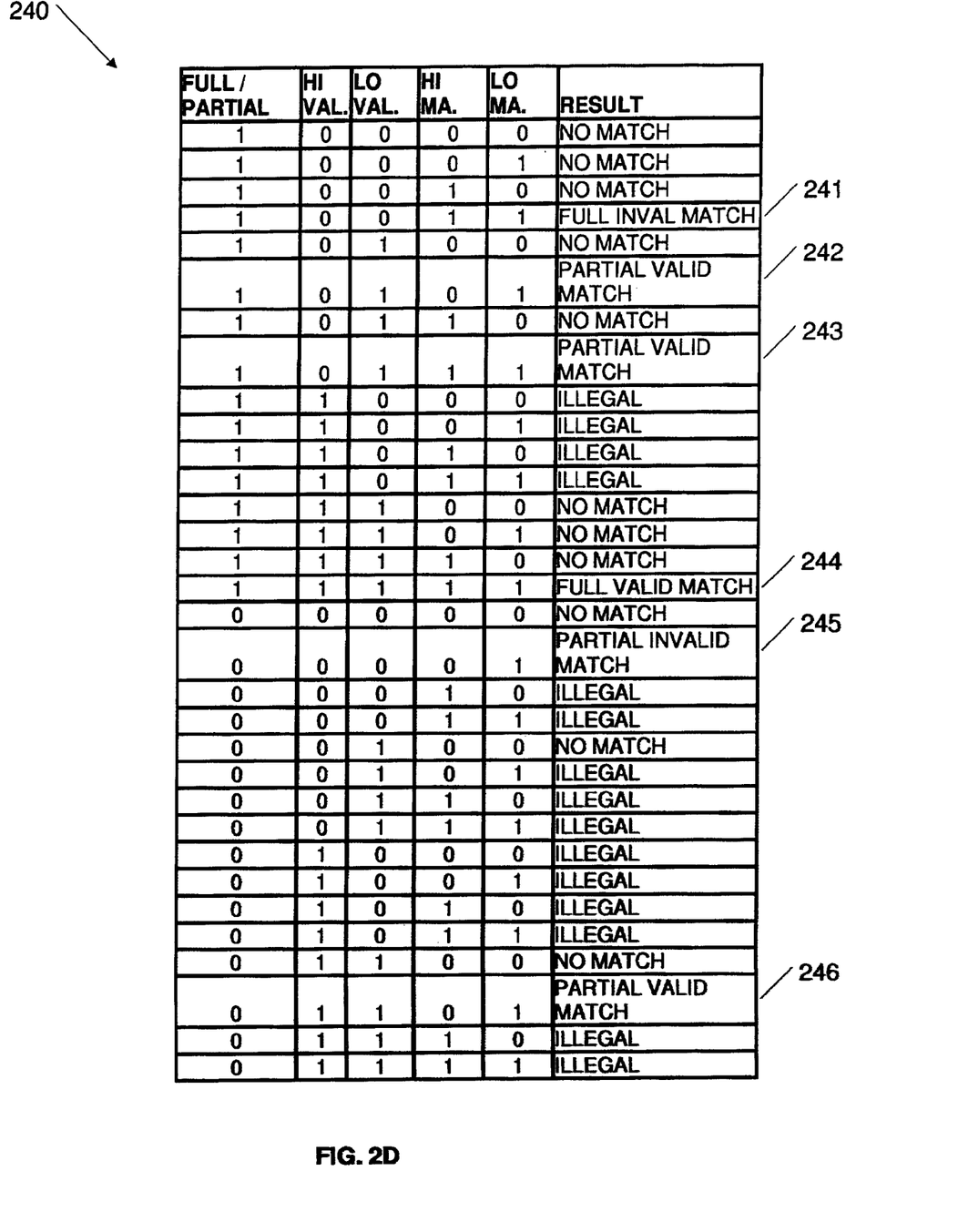
FIG. 2D shows a table illustrating the different combinations that the address array in FIG. 2C may have, as well as the resulting logic matches.

Table 240 in FIG. 2D shows the generation of the defined signals described in the preceding discussion for address array logic 233 in FIG. 2C, based on whether incoming address 220 for a transaction is a full address or a partial address, for different combinations of high and low valid bits, and whether high or low addresses have matched. In other words, the various entries in table 240 may correspond to the different possible combinations of logic which may be computed by address array logic 233. Entry 244 may correspond to full valid match 235. Entry 241 may correspond to full invalid match 236. Entries 242, 243, 245, and 246 may correspond to partial valid match 237. The remaining entries in table 240 correspond to no match 234 or indicate an illegal result.

Figure 2E:
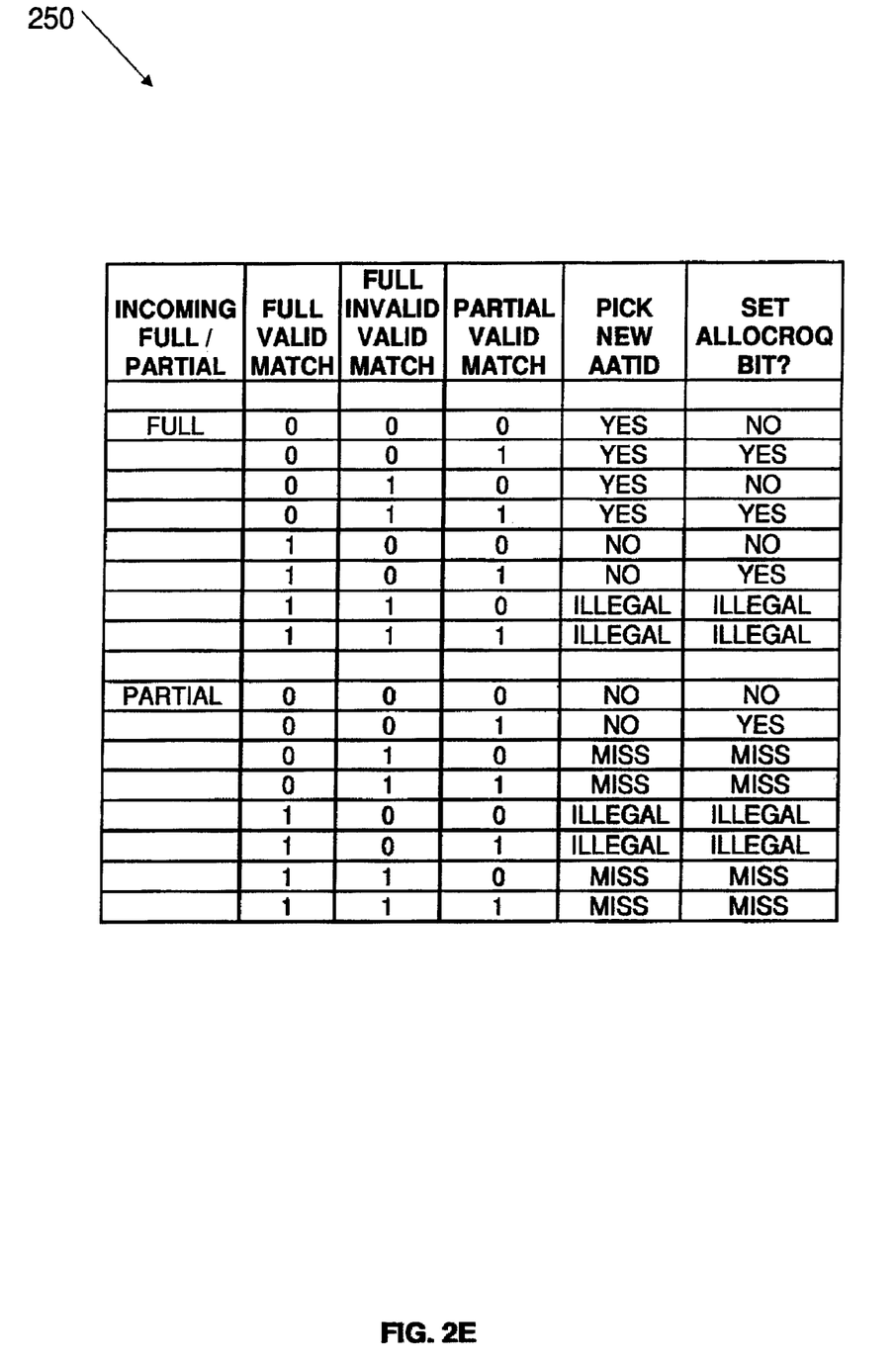
FIG. 2E shows a home agent tracker state table for implementing the logic matches of FIG. 2D.

We may now focus on the home tracker logic requirements in order for home trackers to work with a response ordering queue and resolve transaction conflicts. For example, home trackers 144 may need to satisfy numerous logic requirements to work in conjunction with ROQ 148. First, each HT entry may contain an "AllocROQ" bit. This bit may be reset on allocation and set based on the CAM results of the address array. Based on the CAM results and whether the incoming address is a partial or full address, home logic may decide whether to set the "AllocROQ" bit and whether a new active address table identification number is required. Table 250 in FIG. 2E shows the decision possibilities for setting the "AllocROQ" bit in each HT.

Once the home tracker logic sets an "AllocROQ" bit for an entry, all updates to the AAT associated with this entry may have a bit set indicating this event. From this moment on, logic for the AAT may continue to update the AAT entry having its bit set but the AAT logic may hold the entry in a blocked state. In other words, AAT logic may not make any decisions regarding AAT entry ownership due to the potential for a conflict.

HT logic may detect when all responses are received for an entry or when an entry receives a "Rsp*Fwd" or "Rsp*Wb" message. When HT logic detects either of these conditions for an entry, and the "AllocROQ" bit is set, the RTID for the entry may be sent to the ROQ push interface so that it may be popped from the ROQ. When HT logic receives a popped RTID from ROQ, the "AllocROQ" bit for that entry may be reset. Subsequent updates to the AAT for this entry will indicate that the "AllocROQ" bit has been reset. If no messages are expected to be sent to the AAT for this entry, a dummy message may be sent to indicate that the "AllocROQ" bit for this entry has been reset.

Figure 2F:
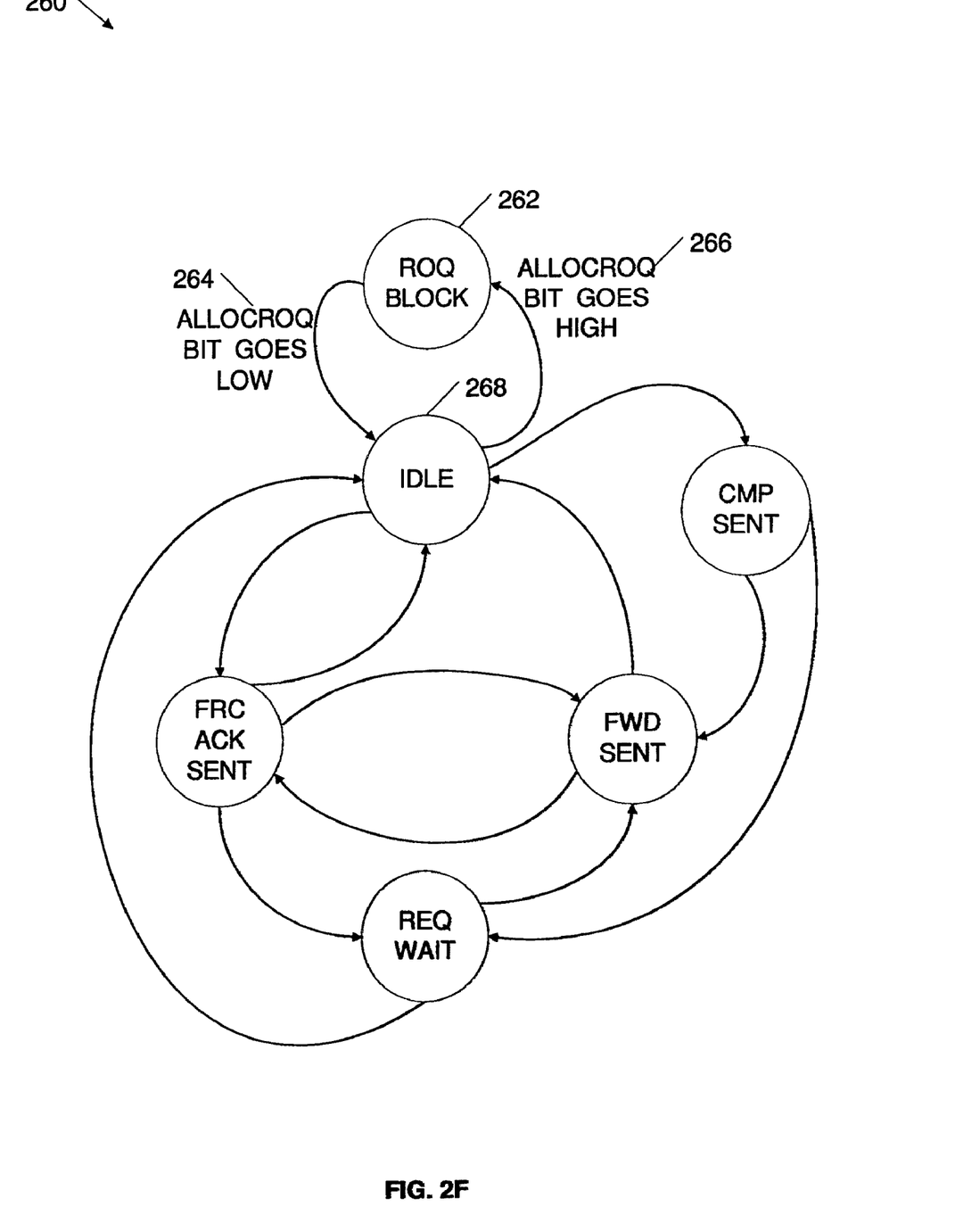
FIG. 2F depicts an embodiment of a finite state machine for an active address table, consistent with FIG. 2E.

For Active Address Table Logic, the AAT FSM may halt from making any decisions for an entry once the "AllocROQ" bit is set for that entry. However, information in the AAT for the entry may continue to be updated. In many embodiments, logic for the ROQ may guarantee by its design that the block will arrive before the AAT logic makes any decision. FIG. 2F shows an embodiment of a finite state machine 260 for an AAT. Of the various transitions that FSM 260 may make, FIG. 2F illustrates how FSM 260 may be in an idle state 268 and transition to an "ROQ Block" state 262 whenever an "AllocROQ" bit for an entry goes high (element 266). FSM 260 may remain in "ROQ Block" state 262 until the home tracker logic receives a popped RTID from the ROQ logic. When this happens, FIG. 2F illustrates how FSM 260 may transition back to idle state 268 whenever the "AllocROQ" bit for the entry goes low (element 264). Stated differently and more concisely, the ROQ logic may prevent the AAT logic from making any decision before the AAT FSM 260 transitions out of idle state 268, based on the status of the "AloocROQ" bit.

Figure 2G:
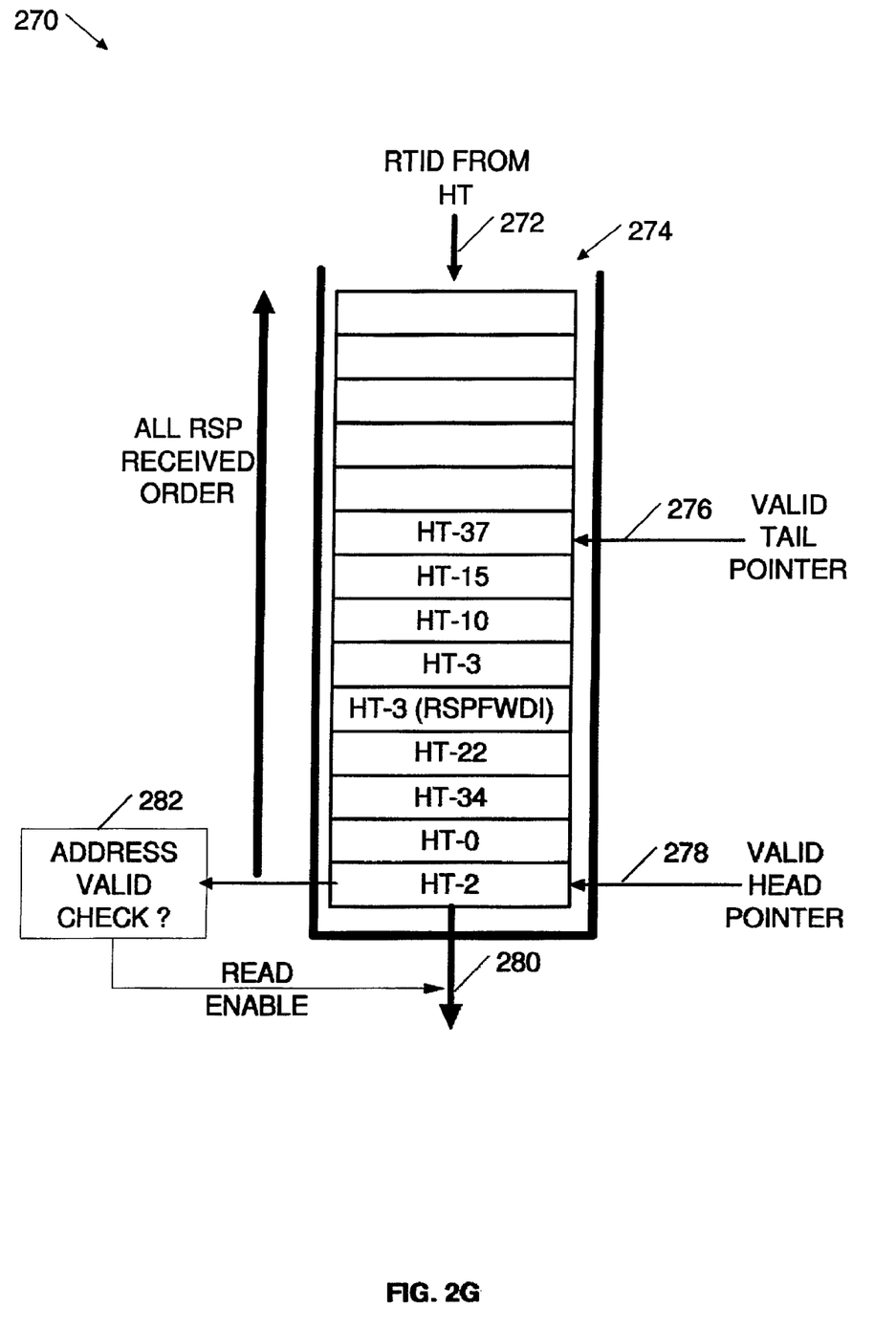
FIG. 2G illustrates how a response ordering queue may block and unblock conflict logic solving for an active address table according to FIG. 2E and FIG. 2F.

As illustrated in FIG. 2G, an ROQ 270 may comprise a FIFO with one write port 280 and one read port 272. The entries 274 of the FIFO may comprise the RTIDs of the memory transactions. The width of the entries in FIFO may be the width of the entry ID in the home logic. For example, the width of the FIFO entries in an embodiment may be eight bits or less. When ROQ 270 receives a push from HT logic at read port 272, the RTID may be written at the tail 276 of the FIFO. The depth of the FIFO may be equal to the total number of trackers in the home logic. For each clock cycle, the entry at a head 278 of the FIFO may be examined. During this examination, if the entry at the head 278 has both the high and low valid bits set for the address (element 282), the RTID may be popped from ROQ 270 and sent to the HT. In various embodiments, once a "Rsp*Fwd" or "Rsp*Wb" type entry is unblocked or popped from ROQ 270, all entries behind it, until another "Rsp*Fwd" or "Rsp*Wb" entry is encountered, may also be unblocked in the same clock cycle. Other embodiments may be designed to pop the entries in order, since the updates to the HT may be done in order using a simple bus.

Figure 3:
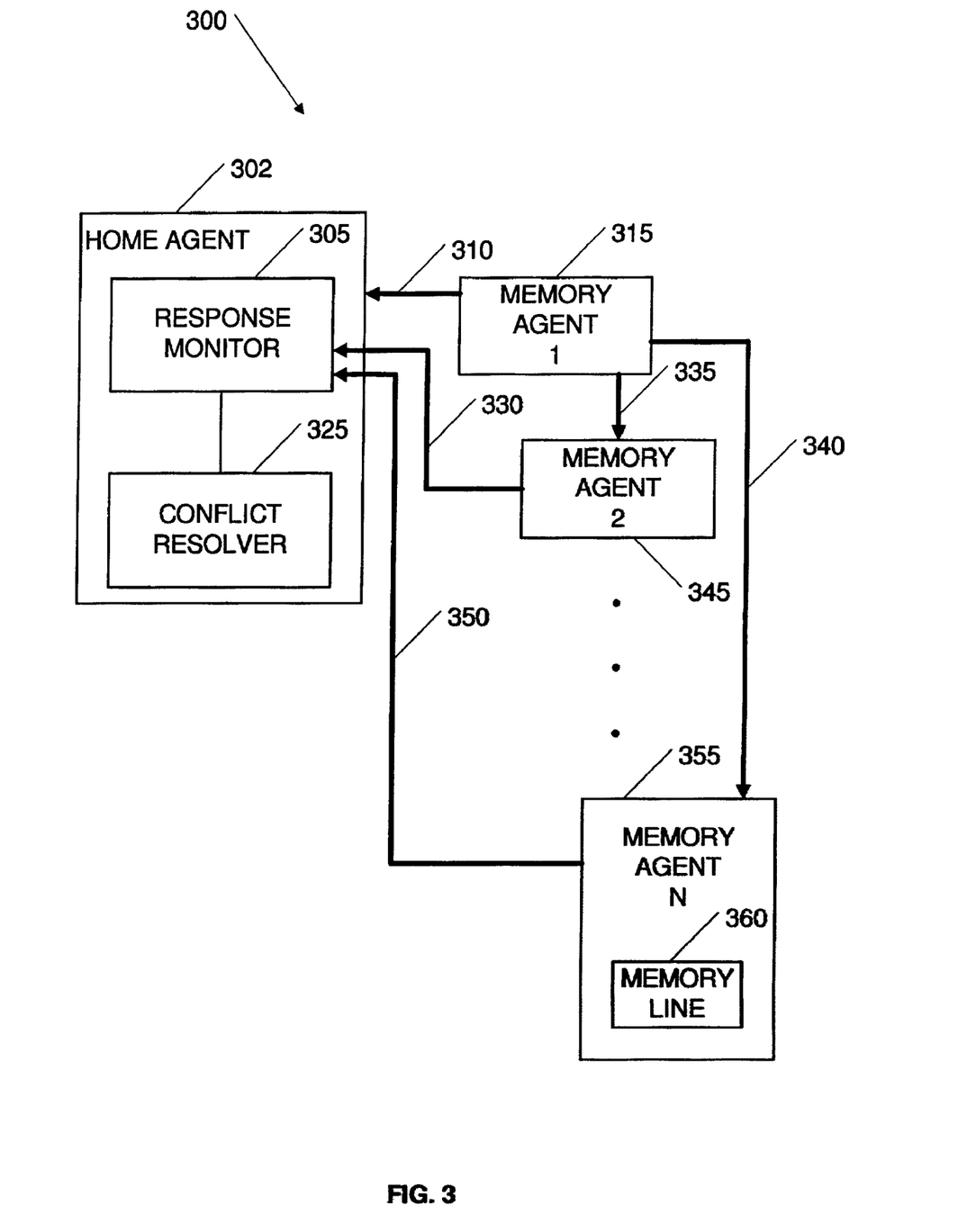
FIG. 3 shows an embodiment of apparatus for resolving conflicts of memory transactions which use partial addresses.

FIG. 3 shows a system 300 having an embodiment of apparatus for resolving conflicts of memory transactions which involve the use of partial addresses. FIG. 3 depicts a home agent 302 comprising a response monitor 305 and a conflict resolver 325. Home agent 302 may receive and/or monitor a variety of different memory transaction requests and responses from other agents in system 300 comprising home agent 302. For example, home agent 302 may receive a request for ownership of a memory line from one of the memory agents in system 300, such as a read for ownership (RFO) 310 from a first memory agent 315.

Home agent 302 may also be able to monitor the actions taken by one or more agents in system 300. Continuing with our example and referring again to FIG. 3, memory agent 315 may need to obtain ownership status for memory line 360, which memory agent 355 may have as a local cache memory line. Not knowing which agent in system 300 owns memory line 360, agent 315 may issue a plurality of memory requests to the other agents. The plurality of requests may comprise, for example, RFO 310 sent to home agent 302, snoop 335 to memory agent 345, snoop 340 to memory agent 355, and other requests to other agents in system 300. Home agent 302 may receive RFO 310 and wait for the associated snoop responses issued from the agents, such as response 330 from memory agent 345 and response 350 from memory agent 355.

Home agent 302 may also comprise a conflict resolver 325. Conflict resolver 325 may process information pertaining to the memory transactions received by home agent 302 and ensure that conflicting transactions are properly handled by home agent 302. For example, memory agent 315 and memory agent 345 may both request ownership of memory line 360. Memory agents 315 and 345 may each issue RFOs to home agent 302 and issue snoops to other memory agents in system 300. As illustrated in FIG. 3 and noted before, memory agent 315 may issue RFO 310 and snoops 335 and 340. Home agent 302 may receive both of the RFOs from memory agents 315 and 345 and send this information to conflict resolver 325. Additionally, response monitor 305 may monitor each of the responses generated by each of the memory agents in for the snoops. For example, response monitor 305 may monitor responses 330 and 350 generated by memory agents 345 and 355 for snoops 335 and 340. Home agent 302 may also transfer such response information from response monitor 305 to conflict resolver 325 so that conflict resolver 325 may use the response information, along with the information of the associated requests, when processing the memory transactions and resolving any conflicts.

While processing the information for the requests and responses, in our example, conflict resolver 325 may receive partial address information in one or more of the responses. For example, in responding to snoop 340 memory agent 355 may send the data of memory line 360 to memory agent 315 but only issue partial address information in snoop response 350. Consequently, when response monitor 305 transfers the partial address information of response 350 to conflict resolver 325, conflict resolver 325 may not immediately recognize the potential for a conflicting transaction. To properly handle this situation, conflict resolver 325 may suspend conflict resolution for RFO 310 and the conflicting RFO from memory agent 345. Conflict resolver 325 may resume conflict resolution upon receiving the complete address associated with response 350, such as receiving RFO 310. Stated differently, conflict resolver 325 may receive responses and requests in various orders, some of which may contain partial addresses information. Conflict resolver 325 may suspend conflict resolution until full or adequate information is determined or made available to ensure that conflicts of the requests and responses can be properly processed.

Figure 4:
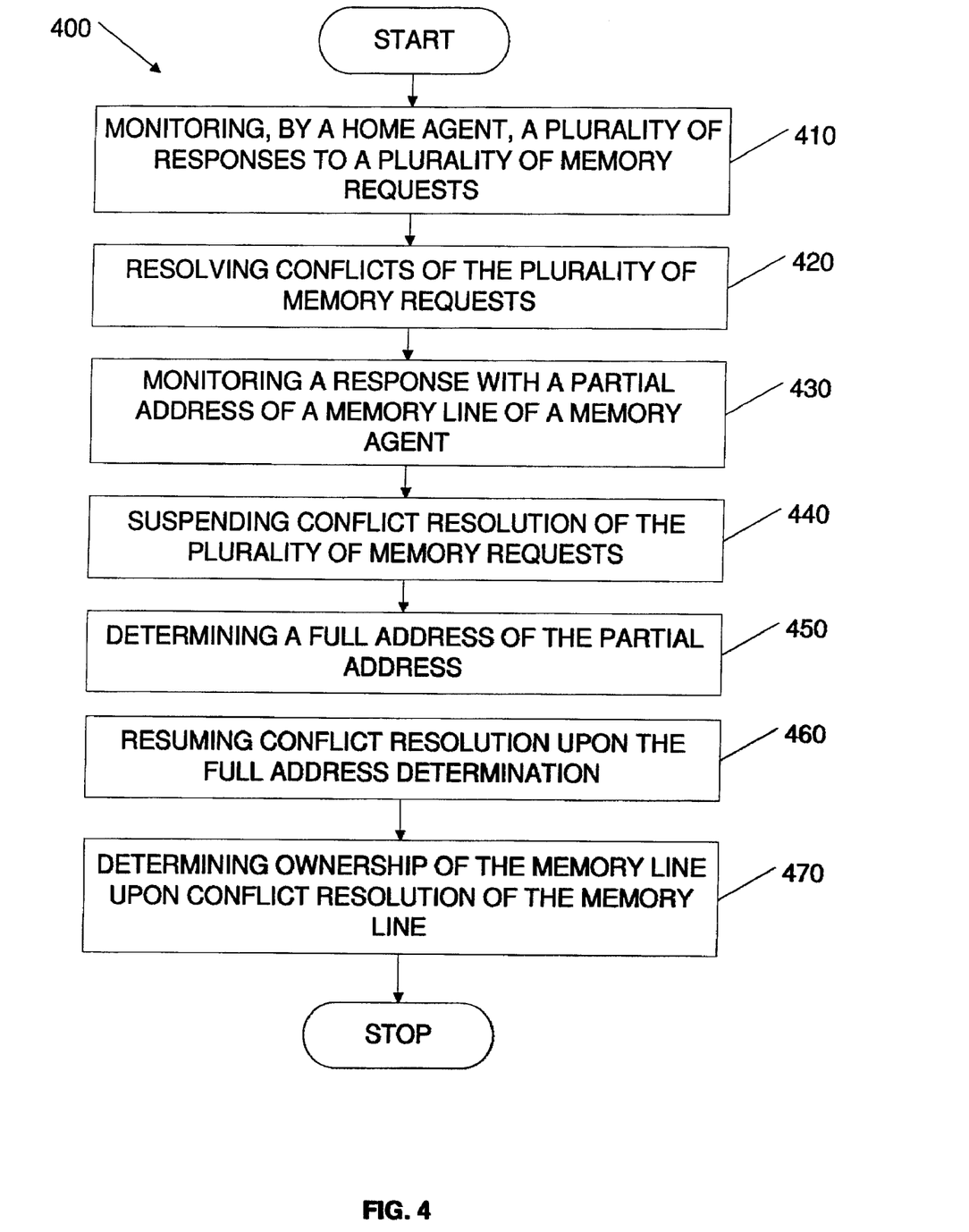
FIG. 4 illustrates a method for resolving memory transaction conflicts which result from the use of partial addresses.

FIG. 4 depicts a flowchart 400 illustrating an embodiment of a method for processing memory transactions which have partial or incomplete address information. Flowchart 400 begins with a home agent monitoring a plurality of responses to a plurality of memory requests (element 410). For example, the home agent may receive a request to write-back a certain memory line from a memory agent to memory of the home agent. An embodiment according to flowchart 400 may continue by resolving conflicts of the plurality of memory requests (element 420) and monitoring one or more responses of memory agents that have partial address information (element 430). For example, a snoop response from a memory agent may contain only the lower 38 bits of a 64 bit address.

An embodiment according to flowchart 400 may continue by suspending conflict resolution of the plurality of memory requests (element 440) and determining a full address of the partial address (element 450). For example, the home agent may stop processing memory requests or memory transactions whenever responses contain partial address information which matches, at least partially, the address information of one or more of the memory transactions. As a more specific example, a home agent may suspend processing a request for write-back of address "01FA9B48" upon receiving a response with partial address information "FA9B48", which matches the lower address portion of "01FA9B48".

An embodiment according to flowchart 400 may continue by resuming conflict resolution upon determination of the full address (element 460). Keeping with the example, the home agent may resume resolving conflicts upon receiving the full address "01FA9B48" of the memory transaction request associated with the partial address response. An embodiment according to flowchart 400 may conclude by determining ownership of the memory line upon conflict resolution of the memory line (element 470). For example, the home agent may determine that none of the agents in the system own a memory line, such that ownership is maintained by the home agent and main memory of the system.

It will be apparent to those skilled in the art having the benefit of this disclosure that the embodiments herein contemplate methods and apparatuses to process memory transactions which have partial or incomplete address information. It is understood that the form of the embodiments shown and described in the detailed description and the drawings are to be taken merely as examples. It is intended that the following claims be interpreted broadly to embrace all the variations of the embodiments disclosed.

Although some aspects have been described in detail for some embodiments, it should be understood that various changes, substitutions and alterations can be made herein without departing from the spirit and scope of the embodiments as defined by the appended claims. Although one embodiment may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the embodiments, processes, machines, manufacture, compositions of matter, means, methods, or steps, presently existing or later to be developed that perform substantially the same function or achieve substantially the same result as the corresponding embodiments described herein may be utilized according to the embodiments herein. Accordingly, the appended claims are intended to include within their scope such processes, machines, manufacture, compositions of matter, means, methods, or steps.

What is claimed is:

1. An apparatus for processing memory transactions, comprising:
    a queue to store transaction identification numbers, wherein each transaction identification number corresponds to a transaction of a request for ownership of an individual memory line; and
    a home agent to interact with a plurality of memory agents, wherein the home agent comprises:
    a response monitor configured to observe a snoop response of a first memory agent, wherein the snoop response comprises a partial address of a memory line of the first memory agent; and
    a conflict resolver configured to establish priority of conflicting requests for memory lines of the plurality of memory agents, wherein the conflict resolver is configured to compare the partial address with a full address for at least one of the memory transactions, and wherein the partial address comprises fewer bits than the number of bits of the full address, and wherein the conflict resolver is configured to suspend conflict resolution for memory transactions which match the partial address of the memory line until the conflict resolver receives a full address for the memory line, and wherein the conflict resolver is configured to access the transaction identification numbers of the queue to enable the establishment of the priority of conflicting requests, and wherein each of the transaction identification numbers comprises fewer bits than the partial address.

2. The apparatus of claim 1, wherein the plurality of memory agents comprise a plurality of caching agents.

3. The apparatus of claim 1, wherein the response monitor comprises a home tracker unit.

4. The apparatus of claim 1, wherein the snoop response comprises one of a forwarding response and a write-back response.

5. The apparatus of claim 1, wherein the conflict resolver comprises an active address table coupled with a response ordering queue.

6. The apparatus of claim 5, wherein the active address table couples with the response ordering queue via a home tracker unit.

7. A method of processing memory requests, the method comprising:
    monitoring, by a home agent, a read request from a first caching agent and a read request from a second caching agent, wherein the read requests from the first and second caching agents are for a memory line stored in a third caching agent;
    monitoring, by the home agent, a first response and a second response and a third response, wherein the first response is from the first caching agent generated in response to a snoop request to the first caching agent from the second caching agent for the memory line, and wherein the second response is from the third caching agent generated in response to a snoop request to the third caching agent from the first caching agent for the memory line, and wherein the third response is from the third caching agent generated in response to a snoop request to the third caching agent from the second caching agent for the memory line, and wherein the second response comprises communication of a partial address for the memory line;

storing, in a queue, a transaction identification number for the snoop request to the third caching agent from the first caching agent for the memory line, wherein the storing the transaction identification number is in response to determining a match of the partial address with a full address of the read request from the second caching agent, and wherein the second response indicates that the third caching agent has forwarded data associated with the partial address to the first caching agent, and wherein the partial address comprises fewer bits than the number of bits of the full address; and suspending, in response to the storing the transaction identification number, conflict resolution of transfer of ownership of the memory line until determination of the full address of the read request from the first caching agent.

8. The method of claim 7, further comprising determining ownership of the memory line upon conflict resolution for the memory line.

9. The method of claim 8, wherein the determining ownership of the memory line comprises transferring ownership of the memory line from the third caching agent to the first caching agent.

10. The method of claim 7, wherein the suspending conflict resolution comprises setting a bit associated with the read request from the second caching agent in response to the third response and blocking a computation of logic of an active address table until the bit is reset.

11. The method of claim 7, wherein the suspending conflict resolution comprises locking a computation of logic of an active address table associated with the read request from the second caching agent.

12. The method of claim 7, wherein the suspending conflict resolution comprises pushing the transaction identification number onto the queue.

13. The method of claim 12, further comprising popping the transaction identification number off the queue upon the determination of the full address of the read request from the first caching agent.

14. The method of claim 7, further comprising monitoring, by the home agent, a fourth response, wherein the fourth response is from second caching agent generated in response to a snoop request to the second caching agent from the first caching agent for the memory line, and wherein the fourth response indicates the snoop request to the second caching agent from the first caching agent comprises a conflict for the memory line.

15. The method of claim 14, wherein the monitoring the read request from the second caching agent comprises receiving a read for ownership request.

* * * * *